United States Patent [19]
Rosen

[11] Patent Number: 4,796,348
[45] Date of Patent: Jan. 10, 1989

[54] METHOD AND MEANS FOR ADAPTING PLUMBING VALVE STEMS TO DESIRED TRIM

[76] Inventor: Richard A. Rosen, 3934 Corbin Ave., Tarzana, Calif. 91356

[21] Appl. No.: 58,401

[22] Filed: Jun. 5, 1987

Related U.S. Application Data

[63] Continuation-in-part of Ser. No. 808,270, Dec. 12, 1985, Pat. No. 4,670,959.

[51] Int. Cl.⁴ .................. B21K 21/16; B23P 17/04; B23P 19/04
[52] U.S. Cl. .................................... 29/401.1; 29/234; 29/402.08; 29/464; 29/DIG. 1
[58] Field of Search ............ 29/401.1, 402.06, 402.08, 29/402.11, 402.18, 406, 426.2, 157 R, 157.1 R, 157.1 A, 426.4, 464, 526 R, 234, 240, 282, DIG. 1, DIG. 26, DIG 55, DIG 98; 4/DIG. 7, 191, 192; 137/315

[56] References Cited

U.S. PATENT DOCUMENTS 1,509,430  9/1924  Horsburgh ............... 29/157.1 X
2,266,702  12/1941  Byers .................... 29/402.18 X
4,670,959  6/1987  Rosen .................... 29/401.1

*Primary Examiner*—Timothy V. Eley
*Attorney, Agent, or Firm*—Bryant R. Gold

[57] ABSTRACT

A method and means for adapting a stem of a plumbing valve for use with plumbing trim of a type for which the plumbing valve stem was not originally designed to be used. A bore is drilled into the end of the stem using a conventional hand-held power drill and a special centering tool that provides a first guide hole in alignment with the longitudinal axis of the stem. A transverse hole is also drilled into the stem in alignment with a second guide hole provided by the centering tool. An adaptor, made from a rod having substantially the same diameter as the stem, has a shaft at one end thereof for insertion into the bore drilled into said stem. At least one pin is then passed transversely through both the shaft of the adaptor and the trim to lock rotation of one to rotation of the other, and to prevent the adaptor from disengaging the stem. The other end of the adaptor has a spline thereon that matches a keyway of the plumbing trim that is to be used.

19 Claims, 11 Drawing Sheets

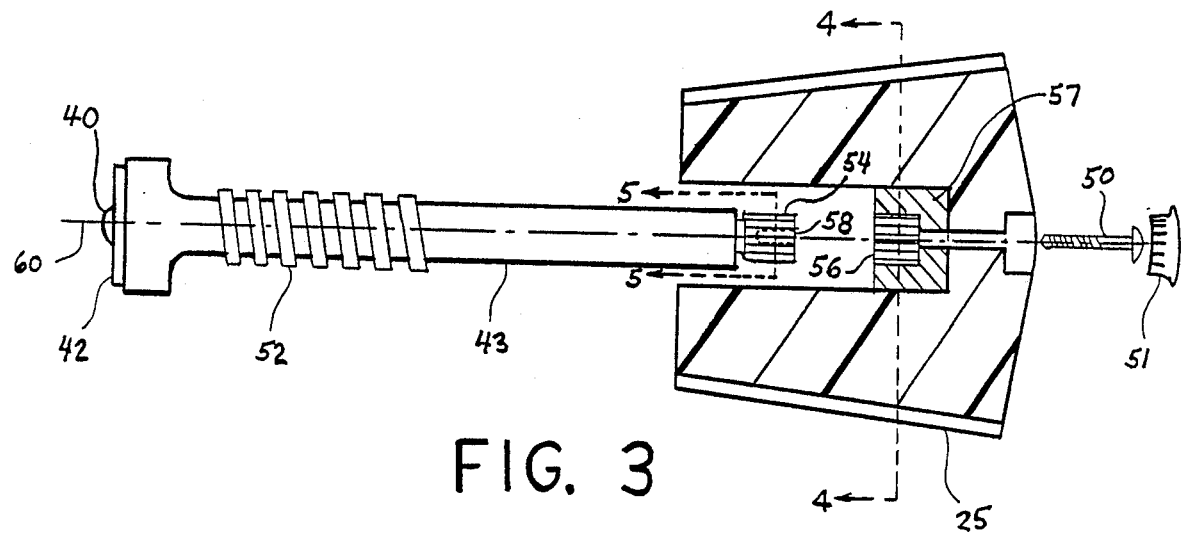
FIG. 3
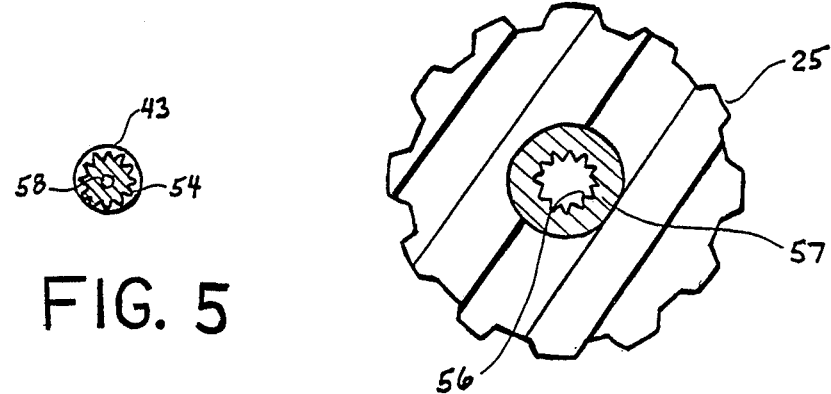
FIG. 5
FIG. 4

METHOD AND MEANS FOR ADAPTING PLUMBING VALVE STEMS TO DESIRED TRIM

This is a continuation in part of U.S. patent application Ser. No. 06/808,270 filed Dec. 12, 1985 and now U.S. Pat. No. 4,670,959.

BACKGROUND OF THE INVENTION

The present invention relates to the interchangeability of plumbing supplies, and more particularly to a method and means for adapting the stem of a plumbing valve unit so that a desired type of plumbing trim can be used therewith, even though the desired plumbing trim is initially incompatible with the stem.

For purposes of the invention described herein, the term "plumbing trim" will be used to describe those components of a plumbing fixture that are readily visible and accessible to a user. Of particular import to the present invention, the term "plumbing trim" includes a handle that engages a stem or shaft of a plumbing valve. By manually turning the handle, the valve can be fully opened, closed, or set to any postion inbetween, thereby allowing hot and/or cold water to be selectively delivered to a nearby spout. In order for the handle to securely grip the valve to which it is attached, so that any rotation of the handle is transferred to an equivalent rotation of the valve stem, it is common in the art to have a spline or key-pattern at the end of the valve shaft. A mating or matching keyway is then included as an integral part of the handle. The spline of the stem then fits snugly into the keyway of the handle or trim, typically secured by an axial screw, and the fitted spline/keyway thus provides for the efficient transfer of torque from the handle to the stem. That is, the spline of the stem acts as a key that becomes lockingly engaged with the keyway of the handle so that the handle cannot turn without also turning the valve stem. The axial screw does not contribute to the transfer of torque from the trim to the stem, rather it merely ensures that the spline and keyway remain lockingly engaged and do not axially separate.

It is common in the art for plumbing valve manufacturers to provide both the plumbing valve—that unit which is mounted behind the wall or under the counter—as well as the plumbing trim that is used therewith. Most manufacturers, in fact, incorporate a unique spline/keyway design for their valve stem/trim combinations so that only their trim can be used with their valves. In other words, in general, there is no valve/trim compatibility in the plumbing industry. Thus, in general, Price Pfister trim can only be used with Price Pfister valves; American Standard trim can only be used with American Standard valves; Borg Warner trim can only be used with Borg Warner valves, and so on. (There are many more valve/trim manufacturers than the three named.)

The incompatibility problem is especially acute in two situations. In the first incompatibility situation, a decision is made (for whatever reason) to change the existing trim. For example, it may be necessary to replace the existing trim because it has broken. It may also be desirable to upgrade the existing trim to a different style during construction or remodeling, or to change the trim so that it matches the trim in another part of the house. Whatever the reason, it often happens that the particular new trim that is wanted is only available from one manufacturer, and that is not the manufacturer of the valve unit that is already in place. Hence, a decision must be made as to whether to chose another kind of trim, available from the same manufacturer who manufactured the existing valve unit, or whether to buy a complete new valve unit, including trim, to replace the old valve unit. Replacing the old valve unit, unfortunately, is usually not a trivial task. It often involves tearing into the wall where the old valve unit is located (especially when the valve unit is used with a tub or shower) and usually ends up being a very messy, time consuming, and expensive job, even for the most experienced plumbers or handymen. Unfortunately, replacing the old valve unit may be the only option available in those situations where the valve unit was installed many years earlier and the valve manufacturer is no longer in business, or there is no acceptable compatible trim available in the market place.

In order to solve the problem created by this first situation (of wanting to change the trim), it is known in the art to provide universal trim that allegedly "fits all" stems. Unfortunately, the mechanism used to accomplish this universal fitting arrangement involves the use of set screws that engage the existing spline at various points around the circumference of the spline. Alternatively, a single set screw is used to engage the spline and stationary teeth on the opposite side of the spline from the set screw are pressed into engagement with the spline as the set screw is tightened. In either embodiment, because only a limited number of contacts are made with the spline by the set screws or stationary teeth, and because the stem and splines are typically made of brass (a relatively soft metal that is used for it anticorrosive properties), it is usually only a matter of time, after successivve tightenings, before the set scres or stationary teeth have sufficiently chewed up the spline so that the second incompatibility problem, as descrbed below, exists (broken or unusable spline). Further, the need to use set screws that radially engage the spline or stem as they are tightened requires that access to these screws be provided. This usually requires that unsightly access holes be included in the trim.

In the second incompatibility situation, the valve stem breaks, thereby provviding no spline to which any trim can be attached. In this second situation, the only alternative known in the art is to replace at least the valve stem. Unfortunately, as seems to happen more often than not, the valve unit is an older unit whose manufacturer has since gone out of business, or who no longer makes replacement parts for the particular valve unit needing its stem replaced, meaning that no replacement valve stem is available. Hence, the entire valve unit must be replaced, which can be a very messy and expensive job, as indicated above.

SUMMARY OF THE INVENTION

The present invention is directed to a method and system that resolves the incompatibility problem that exists between the various plumbing valve and trim manufacturers. More specifically, it is an object of the present invention to provide a means whereby a given manufacturer of trim can provide compatibility between the valve stems of any manufacturer, including a broken valve stem with no spline or one having a damaged spline, and the trim provided by that given manufacturer.

It is a further object of the invention to provide a means whereby any d desired trim can be adapted to fit any existing valve stem.

The invention is realized through the use of a means for milling a spindle on, or dirlling an axial hole in, the existing valve stem; a special adaptor that slips over or fits into this modified stem; and a means for securing the special adaptor to the stem so that torsional forces applied to one are transferred to the other The special adaptor includes, at its unconnected end, a spline that matches or mates with the keyway of the particular trim (handle) that is to be used. The other end of the special adaptor has either an axial (longitudinal) hole therein, or a machined spindle proturding therefrom, depending on the type of modification made to the stem. If the stem has a spindle milled thereon, this spindle is inserted into an axial hole of a first type of adaptor. If the stem has an axial hole machined thererin, a prodtruding spindle from a second type of adaptor is inserted thereinto. In either case, once the stem and adaptor have been appropriately joined by inserting a spindle in an axial hole, the special adaptor is secured to the stem by means of a suitable bonding or securing technique. After the special adaptor has been secured to the stem, the trim is attached in conventional manner.

An important feature of the invention is the ease with which the splindle or axial hole can be machined on the valve stem by even the most unskilled plumbers or do-it-yourselfers. (Hereinafter, the term "machined" may be used to indicate either milling or drilling.) The valve stem is removed in conventional manner (as is done to replace a faucet washer) and secured in a suitable vice or other holding tool. When necessary, the length of the stem is cut down to a specified length. If a spindle is to be milled on the stem, a first type of special centering tool is slipped over the end of the remaining length of stem. A customized hollow mill is fitted in the chuck of a conventional power hand drill or equivalent tool. The customized hollow mill engages the centering tool as it is rotated by the power drill, thereby milling the splindle on the valve stem in coaxial alignment with the longitudinal axis of the stem. A first type of special adaptor, preferably provided as part of an adaptor kit that includes the first type of centering tool and customized hollow mill, is then slipped over the splindle. Using pre-drilled radial holes in the adaptor as a guide, one or more transverse holes are then drilled through the spindle. A pin, also included in the adator kit, is then inserted into each transverse hole so as to engage both the special adaptor and the spindle, thereby assuring a non-slip engagement between the special adaptor and the spindle.

If an axial hole is to be machined into the end of the stem, a similar technique is followed using a second type of centering tool and second type of adaptor. This second type of centering tool guides a drill, driven by a hand-held power tool, so that the resulting hole axis is aligned with the longitudinal axis of the stem. If needed, a reamer, or equivalent tool, can then be used to preccisely machine the hole diameter to a specified size that tightly fits with a machined spindle of the second type of adaptor.

As indicated, in a preferred embodiment, it is anticipated that the centering tool, hollow mill, a supply of special adaptors, a supply of rolling pins, and the needed drill for making the transverse holes, will all be conveniently provided in a single adaptor kit. The special adaptors included in the kit can either all be made for use with a particular manufacturer's trim, or for use with several different types of trim, in which case a variety of special adaptors can be included in the kit, with a group of special adaptors provided for each type of trim that will likely be used. Once such a kit has been obtained by a plumber or other individual, all that need be procured thereafter is the desired trim, which is readily availabe at most plumbing supply facilities. Additional rollar pins and special adaptors can also be made available once the initial supply has been depleted. Such additional pins and adptors can be conveniently provided in a refill kit that supplements the initial kit. New or resharpened hollow mills and drills can also be made available as required.

As is evident from the above description of the means for adapting plumbing valve stems to a desired trim, the method of the invention comprises two main steps: (1) machining a spindle on or an axial hole in the end of the exisitng valve stem, and (2) securely connecting a special adaptor to the machined stem so that torsional forces applied to the adaptor are efficiently transferred to the stem without slippage of either component. Machining the splindle on or the axial hole in the stem is carried out as descirbed above using the special centering tool and the customized hollow mill or drill driven by a power hand tool, such as an electric drill. Connecting the appropriate adaptor to the machcined spindle is also accomplished as described above, namely: (1) drilling a transverse hole that passes through both an end of the adaptor and the stem, and (2) inserting a suitable pin, such as a metal rolled pin, into this hole.

BRIEF DESCRIPTION OF THE DRAWINGS

The above and other objects, features and advantages of the invention will be more apparent from the following more particular description thereof presented in conjunction with the following drawings, wherein:

FIG. 3 is a side view of the valve stem, and includes a sectional side view of the trim that is used therewith;

FIG. 4 is a sectional view taken along the line 4—4 of FIG. 3, and illustrates one type of keyway that forms an integral part of the trim;

FIG. 5 is a sectional view taken along the line 5—5 of FIG. 3, and illustrates one type of key or pattern used on the spline to mate with the keyway of the trim of FIG. 4;

More particularly FIG. 19 is a side view of a valve stem having a spline of an incorrect type showing where the stem is cut at a distance L2 from a wall;

FIG. 20 shows a side view of a centering tool that is slid-over the cut-off stem of FIG. 19, and further illustrates the use of drills aligned with guide holes within the centering tool for drilling a receiving bore and transverse hole in the stem;

FIG. 21 is a side view of an adaptor having a shaft that is inserted into the receiving bore of the stem of FIG. 20, and further illustrates the use of a roll pin to connect and rotably lock the stem and shaft together;

FIG. 22 is a side view of the joined stem and shaft of FIG. 21 and further includes a wall plate and escutcheon; and FIG. 23 shows the wall plate and escutcheon of FIG. 22 in perspective. that is used therewith.

DETAILED DESCRIPTION OF THE INVENTION

Figure 1:
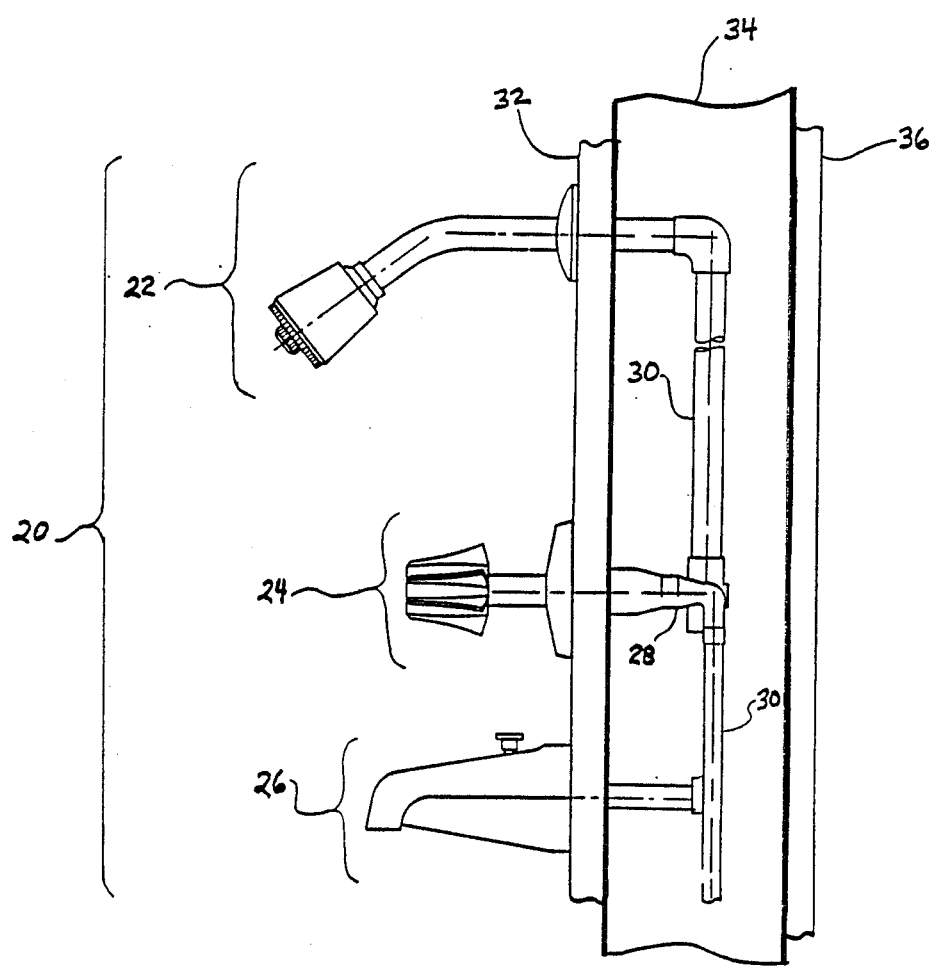
FIG. 1 is a partial side view of the plumbing fixtures associated with a tub/shower combination, and shows both the pipes and valve unit inside the wall, and the trim exterior to the wall.

The following description is of the best presently contemplated mode of carrying out the invention. This description is not to be taken in a limiting sense but is made merely for the purpose of describing the general principles of the invention. The scope of the invention should be determined with reference to the appended claims.

The present invention is best understood with reference to the drawings wherein like parts are designated by the same reference numerals throughout.

Referring first to FIG. 1, there is shown a partial side view of the plumbing fixtures that are commonly associated with a shower/tub combination. Included in FIG. 1 is the external plumbing trim 20 that is visible and accessible to a user from inside of the bathroom where the tub/shower are located. This trim 20 includes a shower head 22, valve trim 24, and spout trim 26. As indicated above, the present invention is concerned with adapting the valve trim 24, and more particularly the handle 25, to an existing valve unit 28 that is behind the wall 32.

As can be appreciated from FIG. 1, the plumbing pipes 30 are located within the wall bounded by the shower/tub wall 32, which usually includes ceramic tile, fiberglass sheets, or some other waterproof coating, and the back wallboard (typically drywall) 36. Wall studs 34, typically spaced every sixteen inches within the wall, provide the primary support for the wall. Once the pipes 30 and valve unit 28 are installed within the wall, and the wallboards 36 and 32, including any tile or other waterproof coating, are added thereto, it is extremely difficult to gain access to the valve unit 28 or the pipes 30. Thus, an important feature of the present invention is the ability to allow the trim 25 to be changed without having to replace the valve unit 28, which replacement would entail knocking a hole in either the bathroom wall 32 or the backwall 36. Neither of these alternatives (of knocking a hole in the wall from either side) can be easily and inexpensively done.

Figure 2:
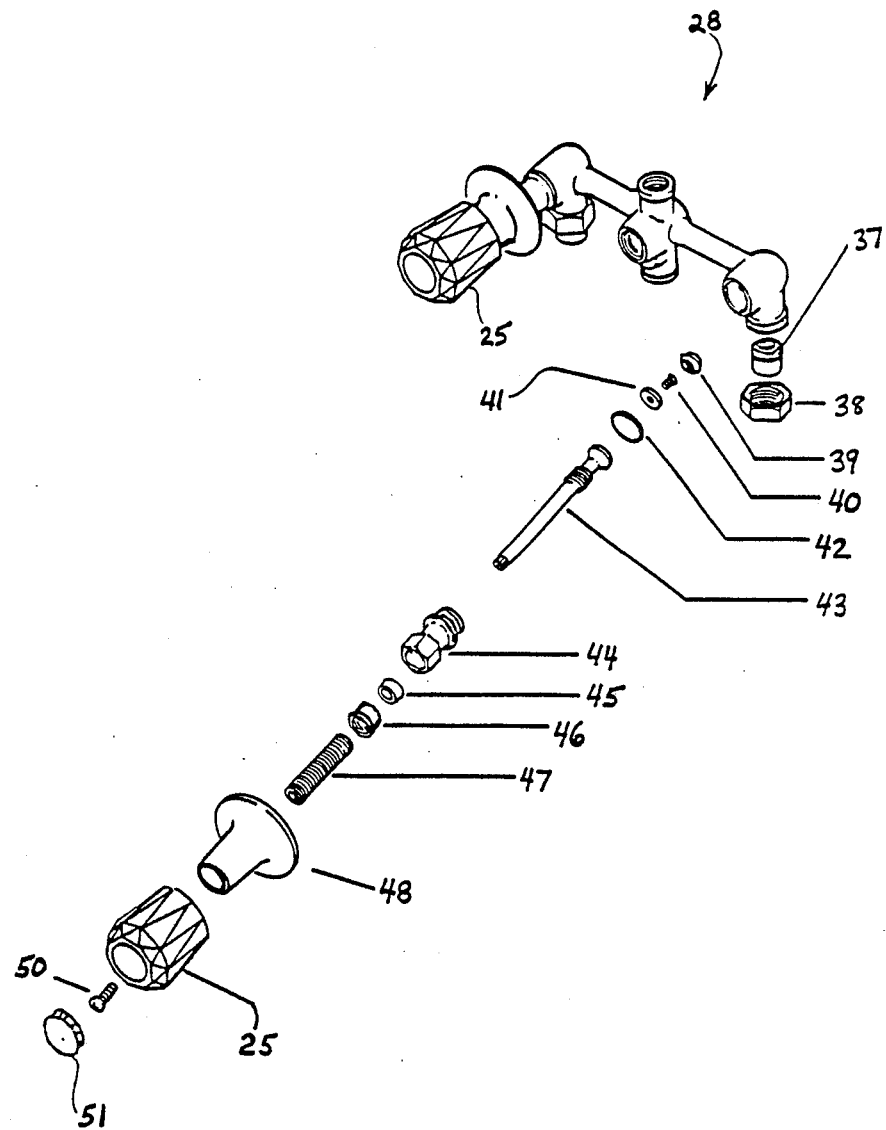
FIG. 2 is an exploded view of the valve unit and its component parts, including the trim.

Referring next to FIG. 2, there is shown an exploded view of the valve unit 28. While the detailed construction of a given manufacturer's valve unit may differ somewhat from what is shown in FIG. 2, it is believed that the exploded view of FIG. 2 shows the main components associated with most valve units.

Referring then to FIG. 2, a pipe adaptor 37 and nut 38 are used to connect the pipe 30 to the valve unit. A valve seat 39 is positioned inside the valve unit 28 and provides the surface against which the valve washer 41, held to the end of the valve stem 43 by screw 40, acts as the valve is opened and closed. Ring washer 42 slides over the valve stem 43 and prevents water from leaking around the stem 43. Bonnet 44, having packing 45 held in place with packing nut 46, provides a channel through which the valve stem 43 is inserted. Threads (not shown) internal to the bonnet 44 engage the threads of the stem 43 in order to allow th stem 43 to axially move as the stem is rotated. Nipple 47 (not used on all types of valve units) also provides a means to which a flange 48 may be secured. The handle 25, as will be explained below, lockingly engages the tip or spline of the stem 43 so that rotation of the handle 25 causes the valve stem 43 to rotate. The engagement between the stem 43 and handle 25 is secured with screw 50. That is, screw 50 prevents the handle 25 from axially slipping off the end of the stem 43. Screw 50 does not transfer the torque from the handle 25 to the stem 43. This torque is transferred through the groves or keys of the spline at the end of the stem 43 as they become lockingly engaged with matching groves or keyways on the inside of the handle 25, as more fully explained below in conjunction with FIGS. 3-5. Finally, a cap 51 snaps into the end of the handle 25 in order to conceal the screw 50. Typically, the cap 51 will also include a letter designation thereon to indicate whether that particular handle is for the cold or hot water valve.

Referring next to FIGS. 3-5, the details of how the handle trim 25 engages the stem 43 are illustrated. In FIG. 3, a side view of the valve stem 43 is shown in conjunction with a sectional view of the trim 25. At one end of the stem 43 the valve washer 42 can be seen as secured to the stem 43 by screw 40. This is the "washer" that most homeowners or other do-it-yourselfers have replaced from time to time in order to repair a leaky faucet. Also shown in FIG. 3 are the threads 52 that engage corresponding threads on the inside of the bonnet 44 (FIG. 2). At the opposite end of the stem 43 is a spline 54. A sectional view of the spline 54 is shown in FIG. 5 as taken along the line 5—5 in FIG. 3. As seen from these figures, the spline 54 comprises a pattern of groves or channels separated by peaks or ridges positioned around the circumference of the spline. A threaded hole 58 is positioned in the center of the spline 54 as viewed in the sectional drawing of FIG. 5. The handle or trim 25 is also shown in FIG. 3, in axial alignment with the longitudinal axis 60 of the stem 43. The trim 25 includes on the inside thereof a keyway block 57 in which a keyway 56 has been prepared in order to lockingly engage the spline 54 of the stem 43. The groves of the keyway 56 match the ridges of the spline 54 in a way that lockingly engages rotation of the handle 25 to rotation of the spline and stem 43. As indicated previously, a screw 50, passing through an axial hole 53 in the handle 25, is screwed into the threaded hole 58 of the stem 43, thereby preventing the trim 25 from becoming axially disengaged from the stem 43. The cap 51 is snapped into place over the head of the screw 50.

Figure 6:
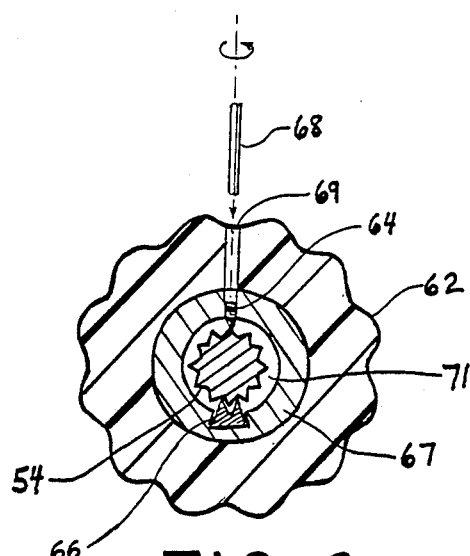
FIG. 6 is a sectional view illustrating one type of prior art trim device that is designed to fit all types of splines.

Referring next to FIG. 6, there is shown a sectional view of a prior art approach for lockingly engaging a handle 62 to the spline 54 of a valve stem 43. In accordance with this prior art approach, the handle 62 includes at least one set screw 64 that is accessed through a radial hole 69 with, for example, an allen wrench 68. A hole 71 in the center of a holding block 67 is made larger in diameter than the largest diameter spline with which the universal "fits all" handle 62 will be used. On the opposite side of the holding block 67 from the set screw 64 one or more stationary teeth 66 are secured to the holding block 67. Hence, as the set screw 64 is tightened (turned so as to move towards the spline 54), both the tip of the set screw 64 and the tips of the teeth 66 engage the spline 54, thereby lockingly engaging rotation of the handle 62 to rotation of the spline 54. Unfortunately, because all the torsional forces are transfered from the handle 62 to the spline 54 on only one or two points, and further because the spline 54 is typically made of brass (a relatively soft metal), it is usually only a matter of time before the set screw 64 and the teeth 66 chew up the spline 54 to the point that it is difficult to maintain a locked relationship therewith. Further, as can be appreciated from FIG. 6, the use of any set screw requires an access hole 69. Such an access hole is difficult to conceal, and the existance of such hole may therefore detract from the attractiveness of the handle 62.

Figure 7:
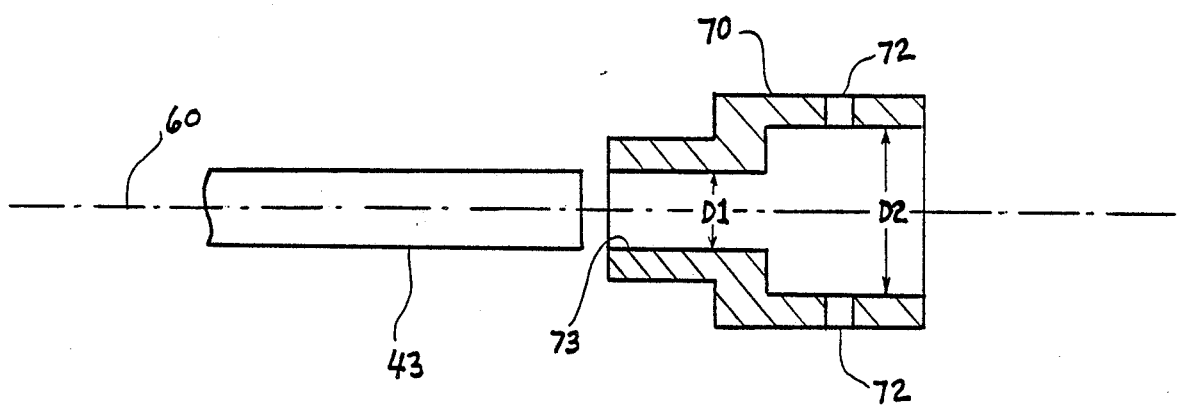
FIG. 7 shows a side view of a cut-off or broken valve stem, and also includes a sectional view of a special centering tool, in axial alignment with the valve stem, the centering tool comprising a key component used in milling a spindle on the stem in accordance with the adapting system of the present invention.

Referring next to FIG. 7, the means for adapting plumbing valve stems to desired trim of the present invention will be explained. FIG. 7 shows a side view of a broken or cut-off valve stem in conjunction with a sectional view of a special centering tool 70. The centering tool 70 comprises a key component, as is explained hereinafter, to enable the milling of a spindle on the valve stem. The centering tool 70 is shown in FIG. 7 in axial alignment with the longitudinal axis 60 of the valve stem 43. (It is noted that only one end of the stem 43 is shown in FIG. 7, as is the case for the figures that follow FIG. 7, the threads 52 not being shown. The spline previously existing on the stem 43 has either been broken or cut off.)

The centering tool 70 has an axial stair-step bore 73 therethrough. A first portion of this axial bore 73 has a diameter D1, and a second portion has a diameter D2. Diameter D1 is sized to be just slightly larger than the outside diameter of the stem 43, thereby allowing the tool 70 to be slid over the stem 43 while maintaining coaxial alignment therewith, as indicated in FIG. 8.

Figure 8:
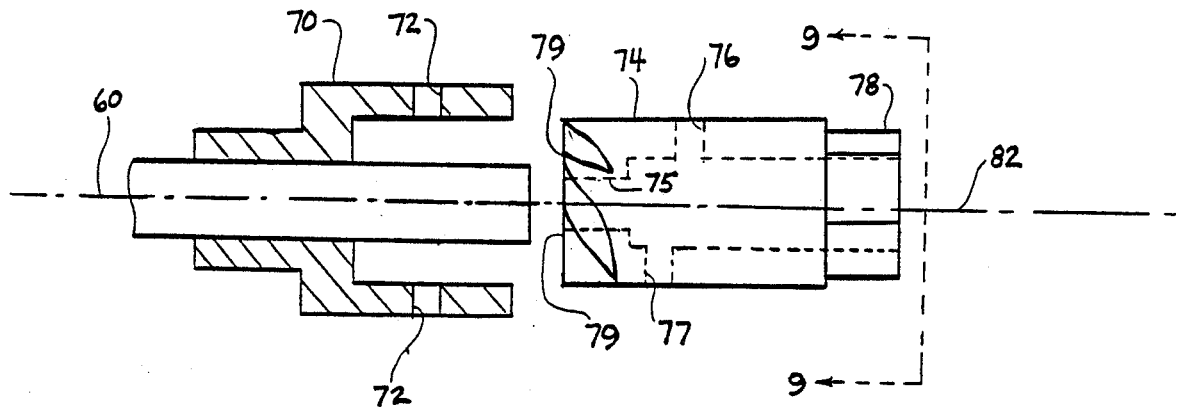
FIG. 8 is a side view as in FIG. 7 with the centering tool slid over the valve stem, and further shows a customized hollow mill in axial alignment with the stem, the hollow mill also comprising a key component used in milling a spindle on the stem in accordance with the adapting system of the present invention.

Referring next to FIG. 8, the centering tool 70 is shown in sectional view as it is slid over the stem 43. A hollow mill 74, customized as described below, is then used to mill a spindle 92 on the end of the stem 43. Advantageously, the hollow mill 74 has an outer diameter that is just slightly less than the diameter D2 of the central bore 73 of the centering tool 70. Hence, as is shown best in FIG. 12, as the hollow mill engages the stem 43 for the purpose of milling a spindle thereon, the centering tool 70 maintains the milling axis 82 of the hollow mill 74 in coaxial alignment with the longitudinal axis 60 of the stem 43.

The hollow mill 74 is of conventional design with the exception of circumferential hex drive 78 that is machined on a rear end thereof. A stair-stepped bore passes longitudinally through the mill 74. A first portion 75 of this bore has a diameter equal to the diameter of the spindle that is to be milled. Cutting blades 79 are on a front end of the mill 74 and it is these blades that perform the milling or cutting function in order to mill away the unwanted portions of the stem 43. Radial holes 76 and 77 are positioned within the hollow mill 74 in order to provide a way for the milled material to be expelled from the device as it is rotated. (It is noted that most of this milled material is lifted by the blades 79 to the outside of the mill, rather than passing to the center bore of the mill.) Escapement holes 72 in the centering tool 70 allow the milled material to be expelled from the working area.

Figure 9:
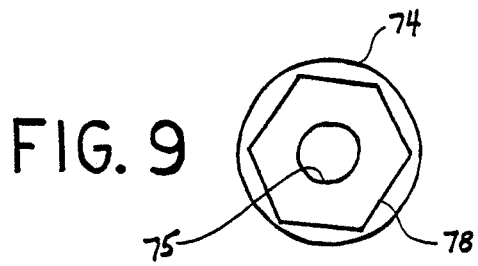
FIG. 9 is an end view of the customized hollow mill of FIG. 8, and illustrates a circumferential hex drive that allows the hollow mill to be engaged and rotated.

As indicated in the end view of FIG. 9, the preferred manner of driving the mill 74 is to engage the circumferential hex drive 78 that is machined on the non-cutting end thereof. This allows the torsional forces that are needed to rotate the hollow mill 74 to be applied near its circumference, thereby improving the amount of torque that can be developed for a given amount of force.

Figure 10:
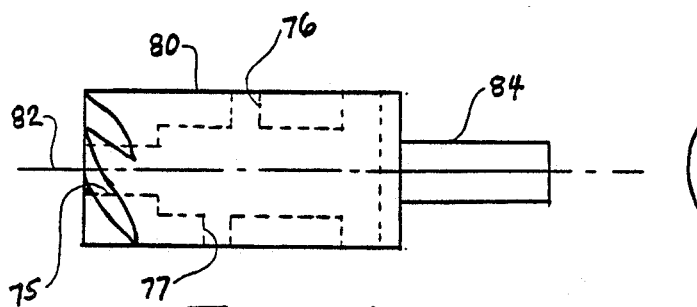
FIG. 10 is a side view of an alternative embodiment of the hollow mill that incorporates a smaller drive shaft.
Figure 11:
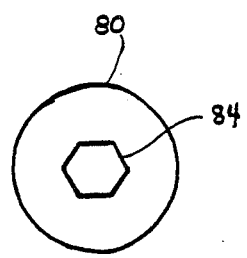
FIG. 11 is an end view of the hollow mill of FIG. 10.

Alternatively, a different embodiment of the customized hollow mill can be used as shown in FIG. 10. In accordance with this alternative embodiment, a hollow mill 80 is provided that includes a smaller diameter drive shaft 84 at the rear end thereof. This smaller drive shaft 84 is sized to fit in the chuck of a ⅜ or ¼ inch electric drill, thereby facilitating the coupling of the hollow mill 80 to the electric drill.

Figure 12:
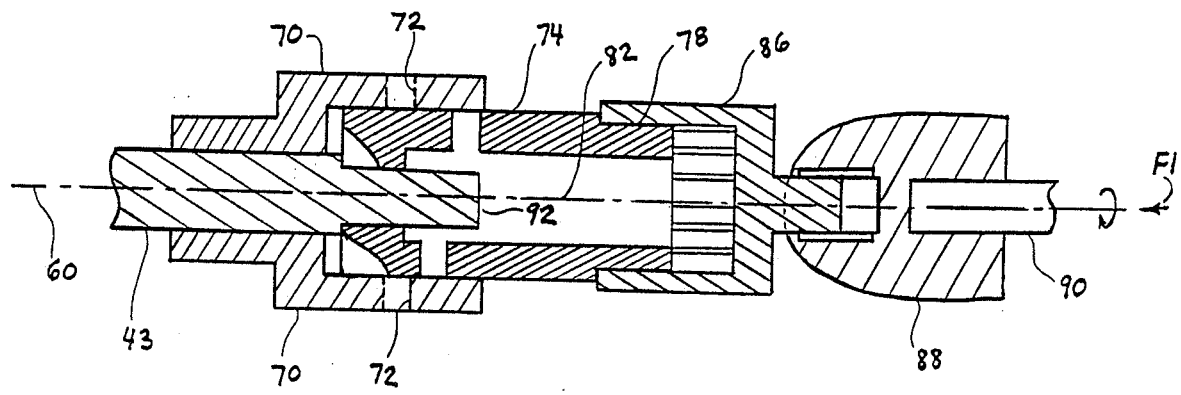
FIG. 12 is a sectional view illustrating the milling of the splindle on the valve stem through the use of the centering tool, the hollow mill, a socket wrench, and a rotating chuck of a hand-held power tool.

Referring next to FIG. 12, a sectional view is shown that illustrates the stem 43 as a spindle 92 is milled thereon. This is accomplished through the use of the centering tool 70, the hollow mill 74, a socket wrench 86 (used to engage the circumferential hex drive 78 of the hollow mill 74), and a chuck 88 of a power-driven rotating shaft 90. The power-driven rotating shaft 90 may be a shaft of an electric hand-held drill, or equivalent hand-held power tool. The chuck 88 can readily engage the drive shaft of a conventional socket wrench 86, which socket wrench is sized to fit the hex drive 78 of the customized hollow mill 74. In the preferred embodiment, the hex drive 78 of the hollow mill is the equivalent of a conventional ⅜ inch hex nut, thereby allowing a conventional ⅜ inch socket wrench to be used to engage therewith. Advantageously, the use of the centering tool 70 assures that the milling axis 82 of the hollow mill 74 is aligned with the longitudinal axis 60 of the stem 43 as the milling operation is performed. The diameter of the valve stem 43 will tyically be between 0.250 and 0.500 inches. In the preferred embodiment, the diameter of the spindle that is milled thereon in accordance with the teachings of the invention is 9/32 inches.

In operation, the spindle 92 can be easily milled on the end of stem 43 as follows. With the stem rotated so that the valve is in its closed position, a reference mark is made on the stem at the point where the stem is flush with the wall. Next, the stem 43 is removed from the valve unit 28 in conventional manner. The stem 43 is secured in a suitable vice or other holding tool, and the stem is cut off at the reference mark. Next, the appropriate centering tool (having the correct diameter D1 to just fit over the diameter of the stem 43) is slid over the stem. The hollow mill 74 is engaged with the chuck of a hand-held power tool, such as an electric drill, through the use of a socket wrench 86, if needed. The mill 74 is then engaged with the centering tool 70 as the power tool rotates the hollow mill 74, thereby milling the spindle on the stem 43. The user of the hand-held power tool applies a manual axial force F1 as needed in order to control the milling of the spindle 92. The power tool supplies the torsional forces needed to cut or mill the stem 43.

Figure 13:
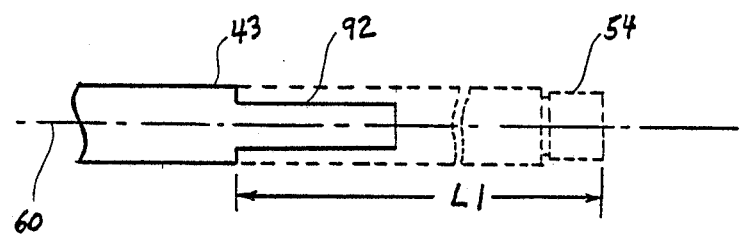
FIG. 13 is a side view of the valve stem after the spindle has been milled thereon, and also shows, in phantom, that portion of the original valve stem that has been removed.

Referring to FIG. 13, a side view of the end of the stem 43 with the spindle 92 milled thereon is illustrated. Also shown in FIG. 13, in phantom (dashed lines), is that portion of the original stem 43, including the spline 54, that has been milled away in making the spindle 92. It is noted that the shoulder where the spindle 92 joins the body of the stem 43 is at a distance L1 from the original length of the stem 43. As will be seen hereinafter, this shortening of the stem 43 is necessary in order to eventually position the new trim 108 (FIG. 17) at an appropriate axial distance from the washer end of the stem 43 (i.e., at an appropriate distance from the wall).

Figure 14:
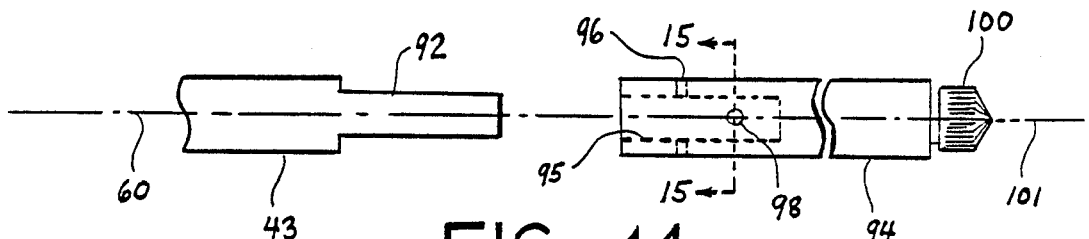
FIG. 14 is a side view of the milled stem of FIG. 13 with a special adaptor in axial alignment therewith, the special adaptor forming an important element of the present invention.
Figure 15:
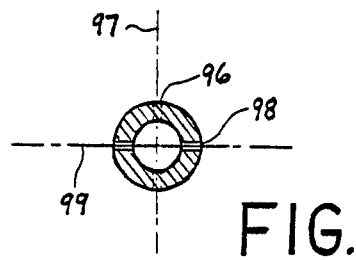
FIG. 15 is a sectional view taken along the line 15—15 of the adaptor of FIG. 14.

Referring next to FIG. 14, a side view of the milled spindle 92 on the stem 43 is shown in axial alignment with a special adaptor 94. The adaptor is made from a rod having substantially the same diameter as the diameter of the stem 43. The adaptor 94 further has an axial receiving hole or bore 95 at a first end thereof that is sized to allow the spindle 92 to be tightly inserted thereinto. That is, the diameter of the hole 95 is only slightly larger than the outside diameter of the spindle 92, and the depth of the hole 95 is at least as long as the length of the spindle 92. Transverse or radial holes 96 and 98 (i.e., holes having an axis that is perpendicular to the longitudinal axis 101 of the adaptor 94) pass through the walls of the adaptor as shown in FIGS. 14 and 15. In the preferred embodiment, the hole 96 is axially spaced-apart from the hole 98, and the hole 96 has an axis 97 that is more or less orthogonal with resepct to the axis 99 of hole 98. The adaptor 94 further has a spline 100 at the end thereof opposite the axial hole 95. This spline 100 is of a type and design adapted to mate or match with the corresponding keyway 106 of the new trim 108 (FIG. 17) that is to be used with the valve unit 28.

The adaptor 94 has an approximate length L2. This length L2 is selected to position the new spline 100 at an appropriate distance from the wall 32 (see FIG. 1) so that the new trim 108 can function properly without hitting the wall or other trim. As indicated previously, the original stem 43 was cut off at a reference point that was flush with the wall. Hence, the length L2 is selected so that the new trim 108 will be positioned at an appropriate distance from the wall as determined from this reference point. Advantageously, this distance L2 will be a fixed distance for a given type of new trim 108.

Figure 16:
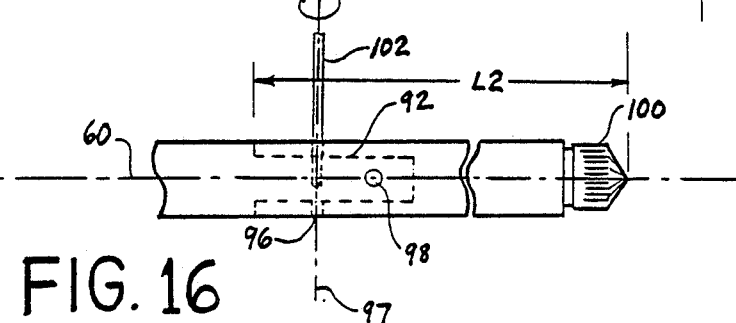
FIG. 16 is a side view of the milled stem with the adaptor slid over the spindle, and illustrates the use of a drill to drill a hole transversley through the spindle in alignment with a transverse hole pre-drilled in the adaptor.

Once the adaptor 94 has been slid over the spindle 92, as shown in FIG. 16, a drill 102 is used to drill transverse holes through the spindle 92 that are aligned with the pre-drilled holes 96 and 98 in the adaptor 94. Advandtagously, these pre-drilled holes 96 and 98 serve as a drill guide for the drilling of the transverse holes through the spindle 92. This allows these spindle holes to be quickly and accurately drilled in alignment with the pre-drilled holes 96 and 98.

Figure 17:
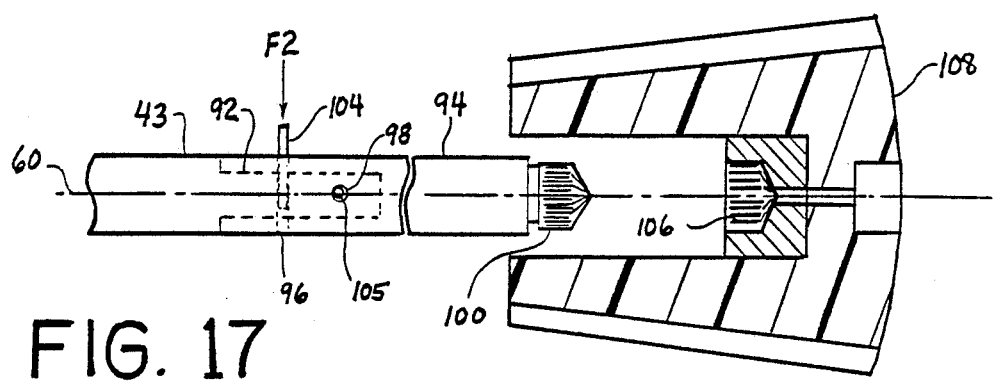
FIG. 17 shows the milled stem engaged with the adaptor, as in FIG. 16, and further shows the insertion of rolling pins into the traverse holes in order to lockably engage rotation of the adapter to rotation of the stem, and also shows, in axial alignment with the stem/adaptor combination, the new trim that is fitted to the spline of the adaptor.

With the holes 96 and 98 passing through both the adaptor 94 and the spindle 92, rolling pins 104 and 105 are inserted into the holes 96 and 98, respectively, through the application of a tapping force F2, as indicated in FIG. 17. These pins 104 and 105 thereby efficiently transfer the torsional forces applied to the adaptor 94 to the stem 43, and prevent the adaptor 94 from slipping with respect to the stem 43.

Other suitable securing means could be used to lock rotation of the adaptor 94 to the stem 43 besides (or in addition to) the pins inserted into transverse holes as described above. For example, a suitable bonding agent, such as a high strength epoxy, could be evenly spread over the spindle 92 and the inside of the bore 95. This bonding agent would then securely bond or glue the stem 43 to the adaptor 92. Further, the axial receiving hole 95 in the adaptor 94 could have a keyway associated therewith, such as a flat surface along one side thereof, thereby requiring that the stem 92 have a corresponding flat surface filed thereon prior to inserting the spindle into the adaptor.

Figure 18A:
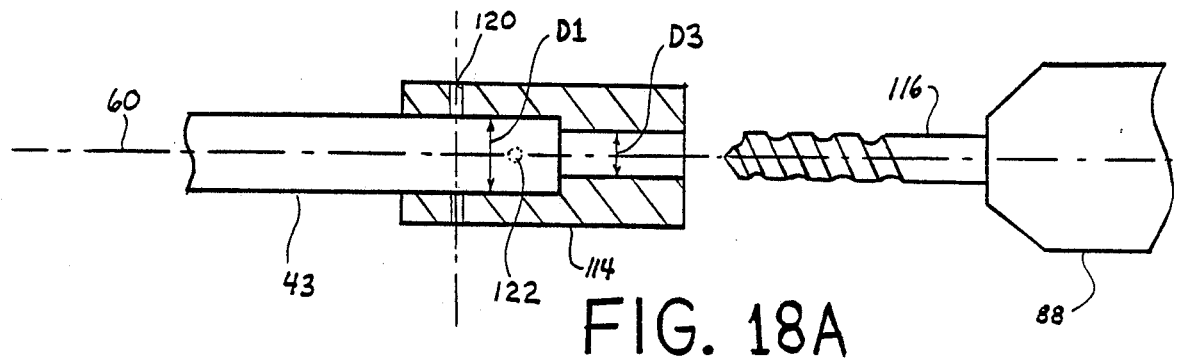
FIG. 18A is a sectional view of an alternative embodiment of the centering tool as it is slid over the valve stem.
Figure 18B:
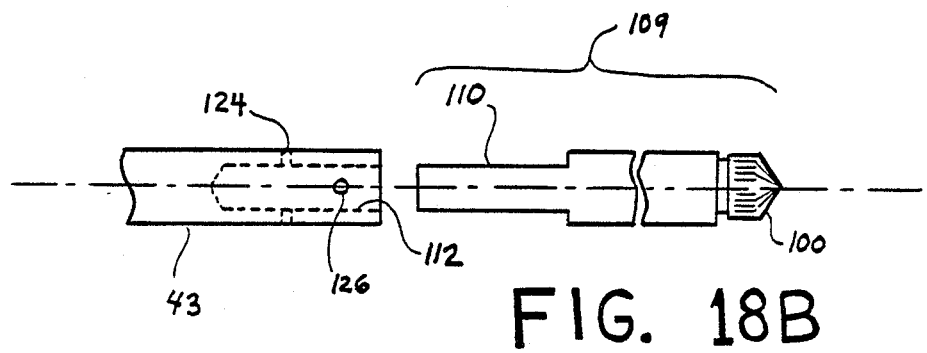
FIG. 18B is a side view of the stem after an axial hole has been drilled therein using the centering tool of FIG. 18A, and also shows an alternative embodiment of the special adaptor that is used herewith.

It would also be possible, as shown in FIGS. 18A and 18B, to provide a second type of adaptor 109 having a spindle 110 pre-milled thereon for insertion into a receiving axial hole 112 in the end of the stem 43. The hole 112 is drilled in alignment with the longitudinal axis 60 of the stem 43 using an alternative embodiment of the special centering tool 114, as shown in FIG. 18A. This centering tool 114 aligns a drill 116 with the stem axis 60 by receiving the drill in hole 118 having a diameter D3 that matches the diameter of the drill 116. After the hole 112 is drilled, it is preferably machined to a precise diameter using a reamer or equivalent tool. This precise diameter tightly matches the machined spindle 110 of the second type of adpator 109. The centering tool 114 may also have pre-drilled transverse holes 120 and 122 therein that serve as drill guides for drilling transverse holes 124, 126 through the stem 43, which holes 124, 126 may in turn serve as drill guides for drilling aligned holes through the spindle 110 of the adaptor 109. Pins or other suitable securing means could then be used as described above to lockingly engage the adaptor 109 to the stem 43.

Once the adaptor 94 (or the adaptor 109) has thus been secured to the stem 43, the new trim 108 can be engaged with the new spline 100 in conventional manner, and the desired objective of adapting the new trim 108 to the existing valve stem 43 has been realized. Advantageously, the entire adapting operation can be performed in less than five minutes per stem once the stem has been removed from the valve unit, and typically only about two minutes of this time is required to mill the spindle 92 on the stem and drill the tranverse rolling-pin holes therethrough. This time is contrasted to the many hours (and sometimes even days) that would be required to replace the valve unit 28, which replacement has often been the only alternative heretofore available if a particular trim not matching the existing spline was to be used.

As indicated previously, it is contemplated that all of the components needed in order to practice the present invention will be provided in an adaptor kit. Included in this kit would be the centering tool 70, the hollow mill 74 (and/or the hollow mill 80), a supply of adaptors 94, and a supply of pins 104, 105. Also included in the kit could be the drill 102. More than one centering tool 70 could further be provided in the kit, each having a different diameter D1 (FIG. 7), to provide a range of diameters D1 that match the various valve stem diameters that commonly exist. In practice, only about 3 different valve stem diameters are commonly employed by the various manufacturers of valve units. Accordingly, a kit having three centering tools therein, one for each of the three commonly used stem sizes, could be provided.

Further, while it is contemplated that such a kit would include adaptors 94 therein for use with a particular manufacturer's trim, different sets of adaptors, each set being designed for use with a different manufacturer's trim, could also be provided. Similar kits could be provided for the embodiment shown in FIGS. 18A and 18B.

Figure 19:
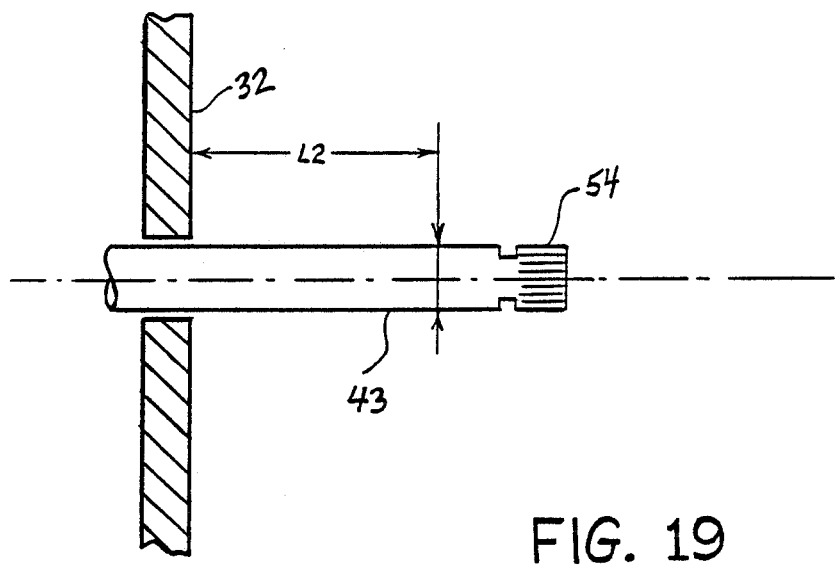
FIGS. 19-23 detail another embodiment of the invention.

Referring next to FIGS. 19-23, an alternative embodiment of the invention is shown. In FIG. 19, a valve stem 43 extends out from a wall 32. A spline 54 on the protruding end of the stem 43 is of a type which does not match with the appropriate trim that is to be used. Accordingly, the stem 43 is cut at a distance L2 from the wall 32, as shown in the figure. (Note, that while FIG. 19 suggests that the incorrect spline 54 is cut off of the stem 43, it is also possible that the spline 54 could be damaged, or the stem 43 could have previously been broken. In either event, it is appropriate to cut the stem 43 at a distance L2 in order to prepare the stem for receiving the adaptor of this alternative embodiment.)

Figure 20:
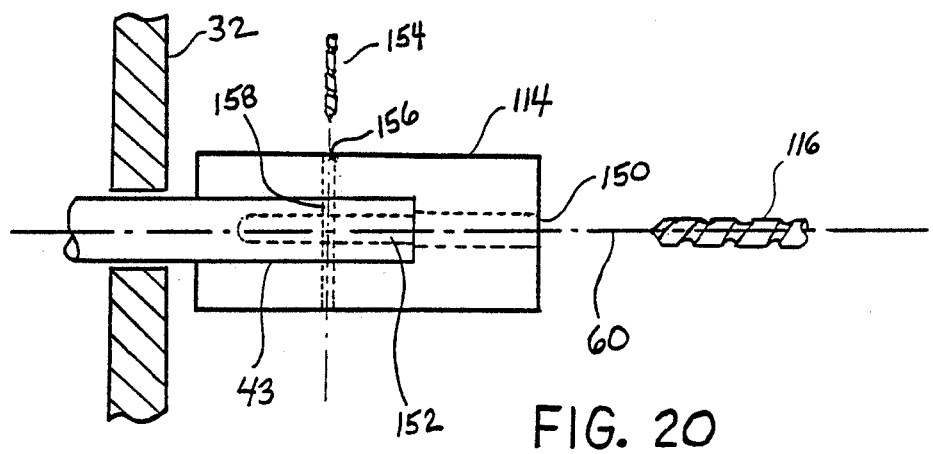

A centering tool 114 is over the valve stem 43 as shown in FIG. 20. The centering tool 114 has a first guide hole 150 therein that is substantially aligned with the longitudinal axis 60 of the stem 43. A drill 116, powered by a hand-held power drill (not shown) can then be inserted into the guide hole 150 in order to drill a receiving bore 152 within the valve stem 43. Similarly, a smaller drill 154, also powered by a hand-held power drill, can be inserted into a second guide hole 156 in order to drill a transverse hole 158 through the stem 43.

Figure 21:
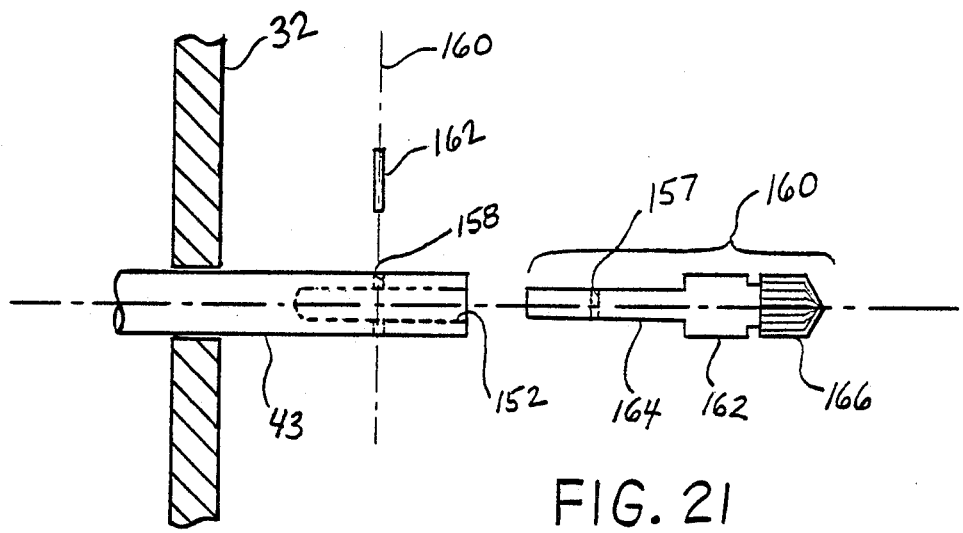

Referring next to FIG. 21, 160 having a body portion 162, a shaft 164 at one end thereof, and a spline 166 of a desired type at the other end thereof. The shaft 164 has a diameter that allows it to be snuggly inserted into the receiving bore 152 of the valve stem 43. The adaptor 160 further includes a transverse hole or slot 157 therein positioned so as to be aligned with the transverse axis 160 of the transverse hole 158. Once the shaft 164 of the adaptor 160 has been inserted into the receiving bore 152, a role pin 162, or equivalent, can be inserted into the hole 158, thereby lockingly engaging the adaptor 160 to the shaft 43.

Figure 22:
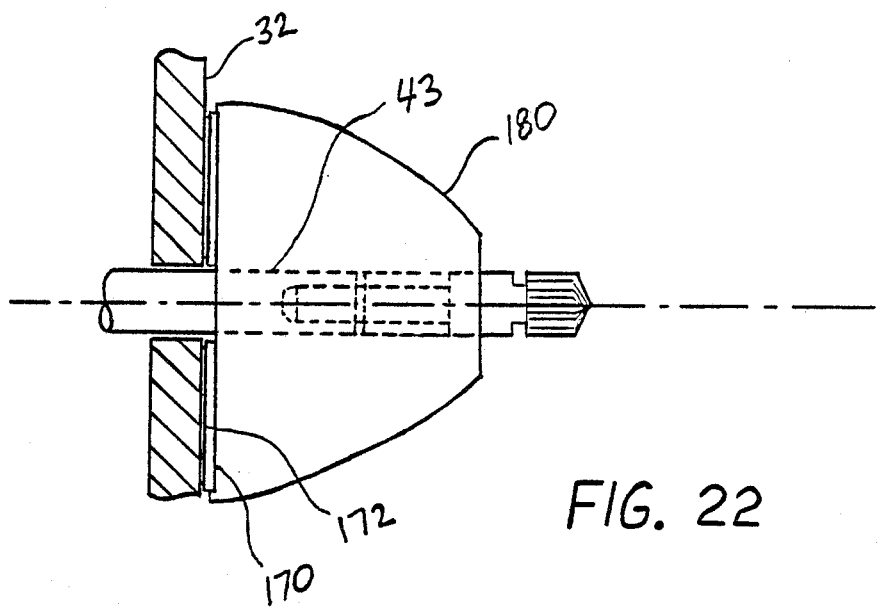
Figure 23:
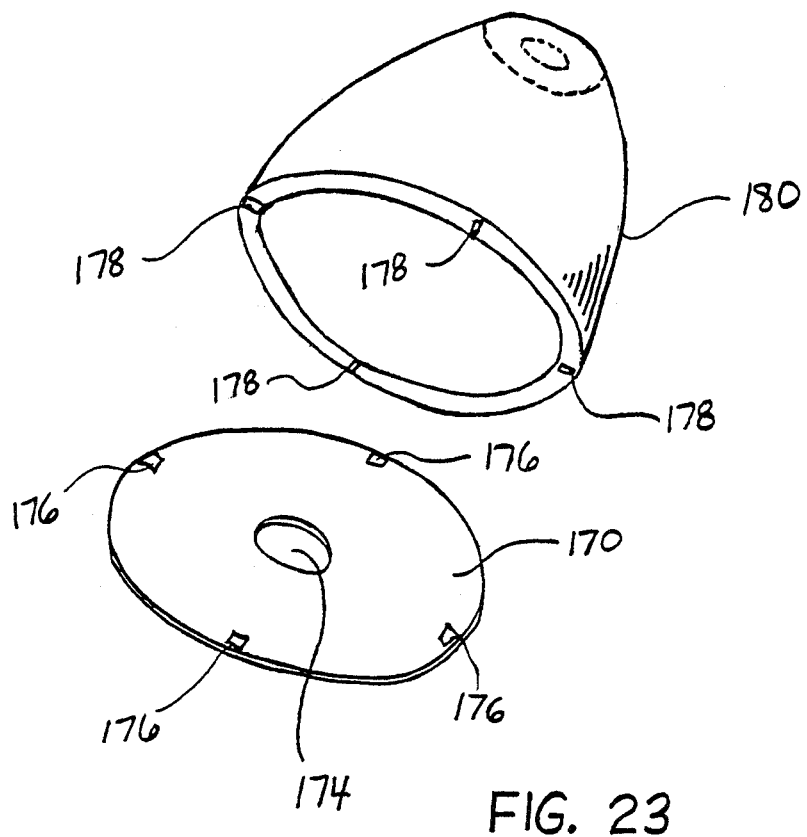

Referring next to FIGS. 22 and 23, the manner of attaching the desired escutcheon to the wall 32 for use with the adapter valve stem 43 is shown. A circular wall plate 170 has an adhesive backing 172 attached to one side thereof. This wall plate 170 has a hole 174 through the center thereof through which the valve stem 43 passes. The wall plate 170 is affixed to the wall 32 by simply removing a protective paper backing placed over the adhesive backing 172 and pressing the wall plate in its desired location. Alternative methods for connecting the wall plate 170 to the wall 32 could, of course, be used. The wall plate 170 has a plurality of locking tabs 176 equally spaced around the parameter thereof. These tabs 176 are adapted to lockingly engage with corresponding slots 178 positioned around the base of the escutcheon 180. The escutcheon 180 is secured to the wall plate 170 by merely twisting the escutcheon 180 so that the slots 178 lockingly engage the tabs 176.

Advantageously the escutcheon 180 can be made from platable ABS plastic or metal, as can the wall plate 170. The centering tool 114 can be realized with steel or delron. As with the other embodiments herein described, it is contemplated that the centering tool 114, the drills 116 and 154, the adaptor 160, the wall plate 170, and the escutcheon 180 can all be provided in a kit.

While the invention herein disclosed has been described by means of specific embodiments thereof, numerous modifications and variations could be made thereto by those skilled in the art without departing from the spirit and scope of the invention. It is therefore to be understood that within the scope of the appended claims, the invention may be practiced otherwise than as specifically described herein.

I claim:

1. A method of adapting plumbing trim having a keyway of a first type with a stem of a plumbing valve, said stem having an end that does not match the first type of keyway of the plumbing trim, said method comprising the steps of (a) drilling a first connection means into the end of said stem;
    (b) connecting an adaptor to said first connection means, said adaptor having a spline at a first end thereof that matches the keyway of the first type of said plumbing trim, and said adaptor further having a second connection means at a second end thereof that connects with the first connection means drilled into said stem; and
    (c) joining the keyway of the plumbing trim with the spline at the first end of the adaptor.

2. The method of claim 1 wherein step (a) comprises
    (1) sliding a centering tool over said stem, said centering tool having an alignment axis that is substantially coaxial with a longitudinal axis of said stem when said centering tool is slid over said stem, said centering tool further having a first alignment hole therein coincident with said alignment axis for receiving a rotating drill; and
    (2) drilling a receiving bore in said stem in alignment with said alignment hole of said centering tool by passing said rotating drill through said alignment hole, said centering tool thereby serving as a guide for drilling said receiving bore, said receiving bore comprising said first connection means.

3. The method of claim 2 wherein the second connection means at the second end of said adaptor comprises a shaft, and wherein step (b) comprises inserting said shaft of said adaptor into the receiving bore of said stem, and securely attaching said shaft within said receiving bore so that said shaft cannot rotate without rotating said stem.

4. The method of claim 3 wherein the step of securely attaching said shaft within said receiving bore comprises:
   placing a first transverse hole through the shaft at the second end of said adaptor;
   drilling a second transverse hole through said stem that passes through said receiving bore and that is in alignment with said first transverse hole of said shaft when said shaft is inserted into a said receiving bore; and
   inserting a pin into said first and second transverse holes of said shaft and stem, thereby rotably locking said shaft and stem together.

5. The method of claim 3 wherein the second connection means at the second end of said adaptor further includes a first transverse hole therein, and wherein the step of securely attaching said shaft within said receiving bore comprises:
   drilling a second transverse hole through said stem in alignment with said first transverse hole of said shaft when said shaft is inserted into said receiving bore; and
   inserting a roll pin into said first and second transverse holes of said shaft and stem, thereby rotably locking said shaft and stem together.

6. The method of claim 3 wherein said centering tool further includes a second alignment hole therein for receiving a second rotating drill, said second alignment hole having an axis that is substantially perpendicular to said alignment axis, and wherein step (a) further included drilling a transverse hole in alignment with said second alignment hole of said centering tool.

7. The method of claim 6 wherein the second connection means at the second end of said adaptor further includes a transverse opening, and wherein step (b) further includes inserting pin means through said transverse hole of said stem and said transverse opening of said shaft, thereby rotably locking said stem and shaft together.

8. A system for adapting plumbing trim having a keyway of a first type with a stem of a plumbing valve, said stem having an end that does not match the first type and keyway of the plumbing trim, said system comprising
   means for drilling a first connection means into the end of said stem;
   means for connecting an adaptor to said first connection means, said adaptor having a spline at a first end thereof that matches the keyway of the first type of said plumbing trim, and said adaptor further having a second connection means at a second end thereof for connecting the first connection means drilled into said stem therewith; and
   means for joining the keyway of the plumbing trim with the spline at the first end of the adaptor.

9. The plumbing trim adaption system of claim 8 wherein said drilling means comprises
   a centering tool made to slide over said stem, said centering tool having a guide hole in substantial alignment with a longitudinal axis of said stem; and
   means for drilling a receiving bore into said stem in alignment with said guide hole.

10. The plumbing trim adaption system of claim 9 wherein said second connection means comprises a shaft that is insertable into said receiving bore and means for rotably locking said shaft to said stem.

11. The plumbing trim adaption system of claim 10 wherein said rotatable locking means comprises means for passing a transverse pin through both said stem and said shaft.

12. The plumbing trim adaption system of claim 9 wherein said centering tool further includes a second guide hole for drilling a hole in said stem substantially perpendicular to the longitudinal axis of said stem, and wherein said drilling means further includes means for drilling a transverse hole into said stem in alignment with said second guide hole, said transverse hole passing through the receiving bore drilled in alignment with the guide hole aligned with the longitudinal axis of said stem.

13. The plumbing trim adaption system of claim 12 wherein said second connection means comprises a shaft that is insertable into said receiving bore, said shaft having transverse passage-way means therethrough in substantial alignment with said transverse hole.

14. The plumbing trim adaption system of claim 13 wherein said rotatable locking means comprises a pin that is inserted through said transverse hole and said transverse passage-way means.

15. The plumbing trim adaption system of claim 8 further including:
   a wall plate having a passage-hole through the center thereof;
   means for affixing said wall plate to a wall from which said stem extends said stem extending through said passage-hole; and
   means for detachably affixing escutcheon trim to said plate, said escutcheon trim having a center-hole through which said stem passes.

16. A plumbing trim adaption kit for adapting plumbing trim of a desired type with a plumbing valve stem comprising;
   tool means for aligned engagement with said stem, said tool means having a first guide hole in alignment with the longitudinal axis of said stem;
   an adaptor having a shaft at one end for insertion into a receiving bore drilled into said stem in alignment with said first guide hole, said adaptor having means at the other end thereof for connecting to said plumbing trim; and
   means for rotably locking said shaft of said adaptor with said stem when said shaft is inserted into the receiving bore drilled into said stem.

17. The plumbing trim adaption kit of claim 16 wherein said tool means further includes a second guide hole, said second guide hole having an axis that is substantially perpendicular to the longitudinal axis of said stem.

18. The plumbing trim adaption kit of claim 17 further including drill means for use of a hand-held power drill for drilling a receiving bore of a desired depth in alignment with said first guide hole, and for drilling a transverse hole into said stem in alignment with said second guide hole.

19. The plumbing trim adaption kit of claim 17 further including
   a wall plate having means for affixing said plate to a wall from which said stem extends; and
   escutcheon that is detachably securable to said wall plate, said escutcheon having a hole through which said stem extends.

* * * * *